United States Patent
Rideau et al.

(10) Patent No.: US 10,014,707 B2
(45) Date of Patent: Jul. 3, 2018

(54) METHOD FOR MANAGING THE ELECTRIC POWER NETWORK OF AN AIRCRAFT

(71) Applicant: MICROTURBO, Toulouse (FR)

(72) Inventors: Jean-Francois Rideau, Tournefeuille (FR); Florent Dalmas, Garidech (FR)

(73) Assignee: SAFRAN POWER UNITS, Toulouse (FR)

( * ) Notice: Subject to any disclaimer, the term of this patent is extended or adjusted under 35 U.S.C. 154(b) by 312 days.

(21) Appl. No.: 14/655,707

(22) PCT Filed: Dec. 24, 2013

(86) PCT No.: PCT/FR2013/053262
§ 371 (c)(1),
(2) Date: Jun. 25, 2015

(87) PCT Pub. No.: WO2014/106712
PCT Pub. Date: Jul. 10, 2014

(65) Prior Publication Data
US 2015/0333527 A1   Nov. 19, 2015

(30) Foreign Application Priority Data
Jan. 3, 2013   (FR) .................................... 13 50034

(51) Int. Cl.
*H02J 7/02* (2016.01)
*H02J 9/00* (2006.01)
(Continued)

(52) U.S. Cl.
CPC ............... *H02J 7/02* (2013.01); *B64D 41/00* (2013.01); *H02J 4/00* (2013.01); *H02J 9/00* (2013.01);
(Continued)

(58) Field of Classification Search
CPC ........................................................ H02J 5/00
(Continued)

(56) References Cited

U.S. PATENT DOCUMENTS

| 4,091,613 A | 5/1978 | Young | |
|---|---|---|---|
| 5,764,502 A * | 6/1998 | Morgan | H02J 4/00 307/66 |

(Continued)

FOREIGN PATENT DOCUMENTS

| EP | 2 524 869 A1 | 11/2012 |
|---|---|---|
| FR | 2 964 087 A1 | 8/2010 |

*Primary Examiner* — Joseph Chang
(74) *Attorney, Agent, or Firm* — Womble Bond Dickinson (US) LLP

(57) ABSTRACT

A method for managing an electrical power supply system (1) of an aircraft, the power supply system (1) comprising at least one distribution bus arranged so as to power the electrical loads, at least one generator (G1, G2) of a propulsion engine of the aircraft, at least one engine-class main power unit (MPS1, MPS2), a plurality of contactors (C1-C18) which are capable of electrically connecting the distribution buses to the propulsion engine generator (G1, G2) and/or the main power unit (MPS1, MPS2); and a management module which is capable of controlling the contactors (C1-C18), a method wherein, during normal operating conditions of the aircraft, the distribution bus is powered by the engine-class main power unit (MPS1, MPS2) and, during the back-up operating mode of the aircraft, the distribution bus is powered by the propulsion engine generator (G1, G2).

6 Claims, 5 Drawing Sheets

(51) Int. Cl.
  *B64D 41/00*  (2006.01)
  *H02J 4/00*  (2006.01)
  *H02J 3/00*  (2006.01)
(52) U.S. Cl.
  CPC ........... *B64D 2221/00* (2013.01); *H02J 3/006* (2013.01); *H02J 2003/001* (2013.01); *Y10T 307/406* (2015.04)
(58) Field of Classification Search
  USPC .......................................................... 307/31
  See application file for complete search history.

(56) References Cited

U.S. PATENT DOCUMENTS

| | | | |
|---|---|---|---|
| 2011/0198918 A1* | 8/2011 | Langlois | ............... B64D 41/00 307/9.1 |
| 2014/0125121 A1* | 5/2014 | Edwards | ............... H02J 7/1446 307/9.1 |

* cited by examiner

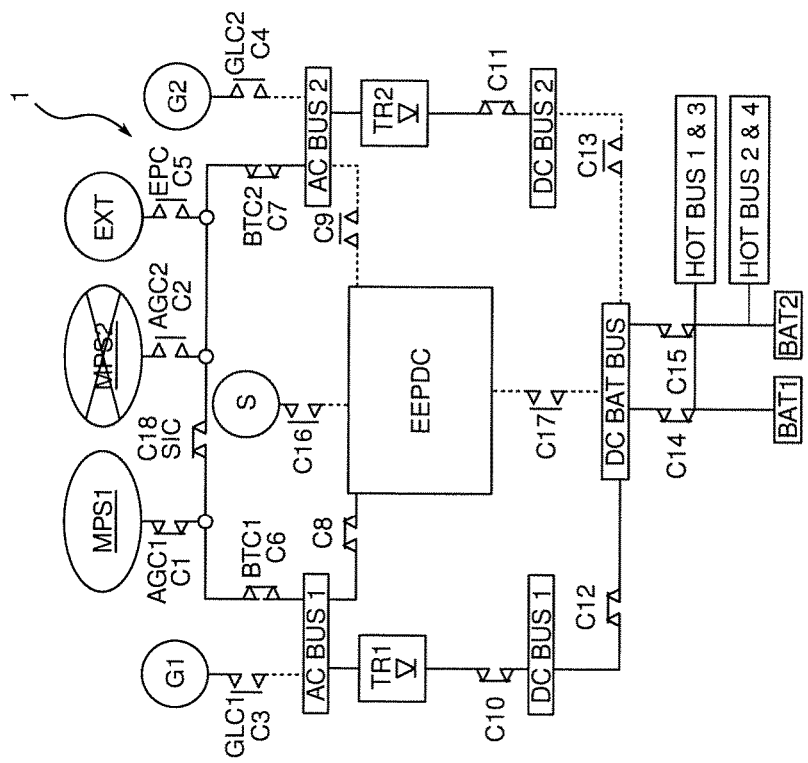
Figure 6
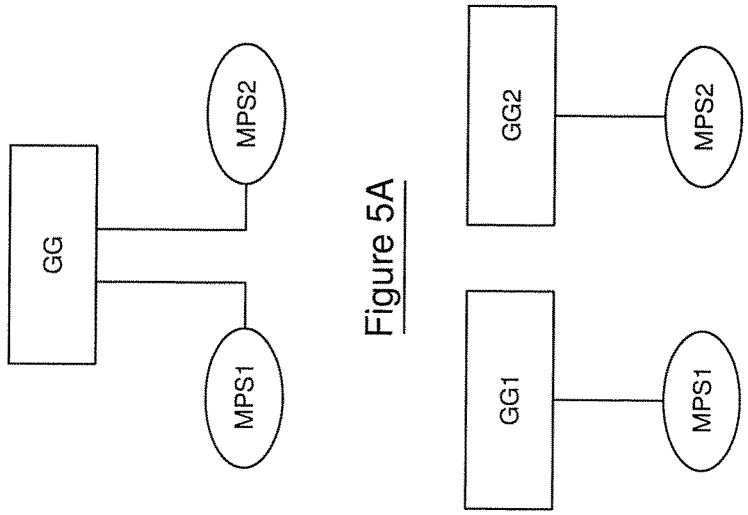
Figure 5A
Figure 5B

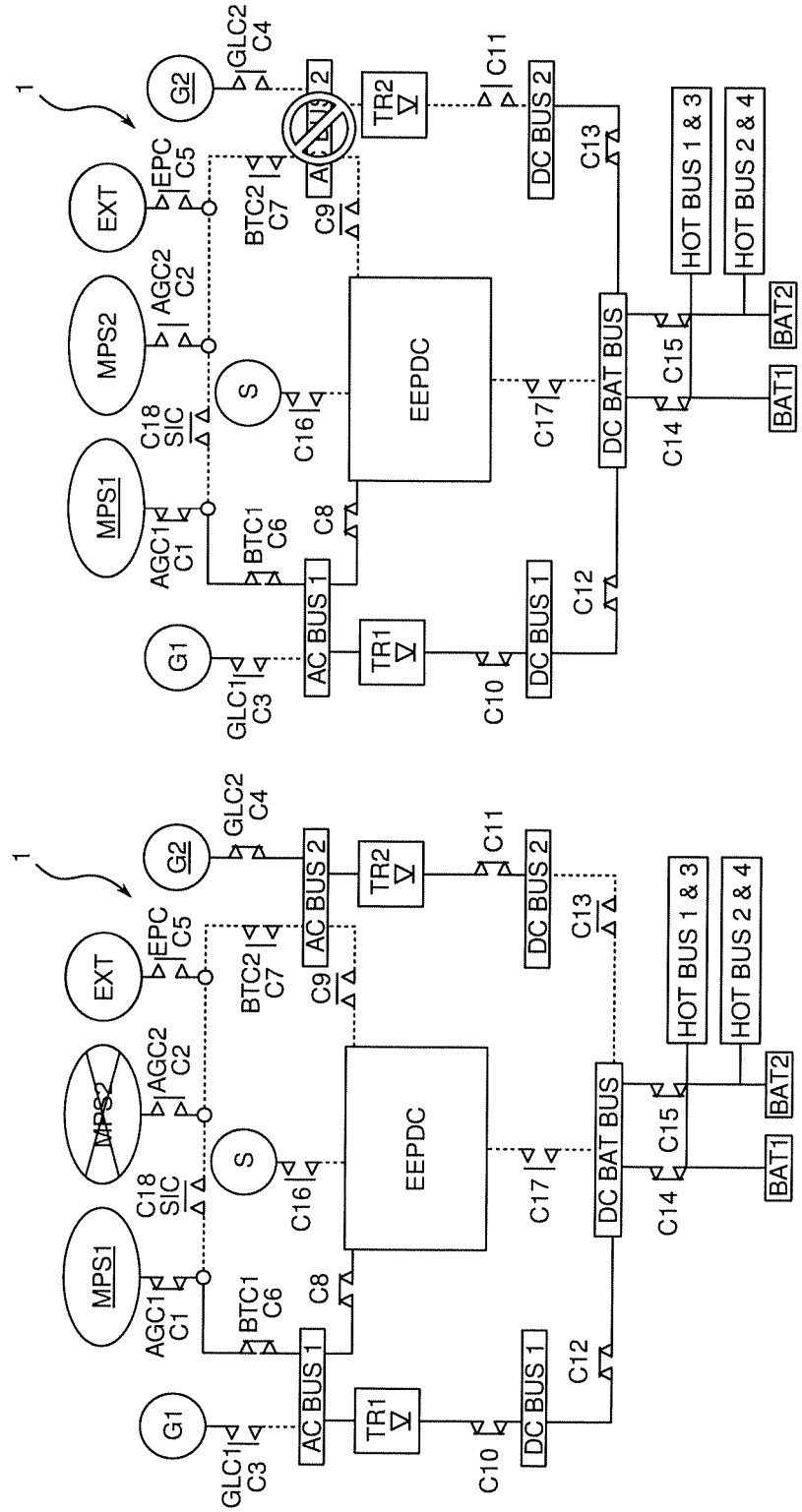

METHOD FOR MANAGING THE ELECTRIC POWER NETWORK OF AN AIRCRAFT

GENERAL TECHNICAL FIELD AND PRIOR ART

The present invention relates to the field of electrical power supply for an aircraft and, more particularly, to a method for managing the electrical power supply system of an aircraft.

An aircraft conventionally comprises an electrical power supply system for powering the various pieces of equipment of the aircraft (mechanical actuators, flight controls, in-seat multimedia systems for passengers, cabin ventilation etc.). In electrical terms, a piece of aircraft equipment is considered to be a load which consumes electrical energy.

In order to allow integrated management of the electrical energy in the electrical power supply system, there are two possible types of load: those that are referred to as "essential" loads which are important for the operation of the aircraft (flight controls etc.) and those that are referred to as "non-essential" loads which are less important for the operation of the aircraft (in-seat multimedia systems for passengers, cabin ventilation etc.). The loads are also divided according to the location at which they are installed so as to be powered by the closest power sources and to avoid, as far as possible, the loss of redundancy and/or of functionally-connected equipment.

The electrical power supply system conventionally comprises a main source of power which is drawn from the engines of the aircraft which are involved in the propulsion of the aircraft. In other words, an aircraft engine supplies, on the one hand, propulsive power to allow the aircraft to move and, on the other hand, non-propulsive power, which is used as the main source of power for the electrical power supply system.

Over the years, the electrical energy needs of aircraft have increased. Also, when the aircraft engines are running at reduced power, for example, during landing, the electrical power supply system is sometimes not sufficiently powered, which is a disadvantage and does not allow the supply of power to non-essential loads (in-seat multimedia systems for passengers etc.) which is a disadvantage for the aircraft passengers. An immediate solution for eliminating this disadvantage consists in increasing the speed of the aircraft engines during landing, but this increases the fuel consumption and is not desirable.

Patent application FR 2 964 087 filed by the company TURBOMECA proposed using a main power unit when the engines are not sufficient for fulfilling the requirements of the electrical power supply system, that is to say as an auxiliary power source. Also, by default, the engines of the aircraft are permanently loaded and must be oversized to meet the electrical requirements. This type of management of the electrical power supply system creates an overconsumption of fuel which is a disadvantage.

BRIEF DESCRIPTION OF THE INVENTION

In order to eliminate at least some of these disadvantages, the invention relates to a method for managing an electrical power supply system of an aircraft, the power supply system comprising at least one distribution bus arranged so as to power the electrical loads, at least one generator of a propulsion engine of the aircraft which is capable of providing a supply of electrical energy, at least one engine-class main power unit which is capable of providing a supply of electrical energy, a plurality of contactors which are capable of electrically connecting the distribution buses to the propulsion engine generator and/or the main power unit and a management module which is capable of controlling the contactors, a method wherein during normal operating conditions of the aircraft, the management module controls the contactors in such a way as to power the distribution bus by the engine-class main power unit and, during the back-up operating mode of the aircraft, the management module controls the contactors in such a way as to power the distribution bus by the propulsion engine generator.

According to the method of management, the engine of the aircraft is no longer involved, by default, in supplying electrical energy during normal flight conditions. In other words, it is no longer necessary to oversize the engine of the aircraft in order for said engine to supply significant non-propulsive power. In fact, according to the invention, the aircraft engine generator is only used during back-up operating mode, that is to say in the event of a malfunction of the engine-class main power unit. Advantageously, the aircraft engine is loaded less during normal flight conditions which allows the fuel consumption thereof to be reduced. The power generated by the aircraft engine is basically propulsive power, the non-propulsive power being supplied by the engine-class main power unit during normal operating conditions.

The use of an engine-class main power unit means that the requirements of the power supply system can be met independently of the engines of the aircraft, which improves energy efficiency. Furthermore, an engine-class main power unit is more reliable than a conventional auxiliary power unit, which is advantageous.

Preferably, during normal operating conditions of the aircraft, the distribution bus is powered exclusively by the engine-class main power unit so as to avoid all use of the propulsion engine generator.

Preferably again, the power supply system comprising a first engine-class main power unit and a second engine-class main power unit, the power supply system comprising at least two distribution buses belonging respectively to a right-hand portion and a left-hand portion of the power supply system, the first engine-class main power unit and the second engine-class main power unit respectively supply the distribution bus of the first portion and the distribution bus of the second portion of the power supply system during normal operating conditions of the aircraft so as to increase the reliability of the electrical power supply, the aircraft still being capable of operating in the event of failure of a portion of the power supply system.

According to an aspect of the invention, the second engine-class main power unit alone powers the distribution buses of the first portion and the second portion of the power supply system in the event of a malfunction of the first engine-class main power unit. In other words, each power unit is dimensioned such that power is supplied continuously to the entire electrical system.

According to another aspect of the invention, the second engine-class main power unit powers the distribution bus of the second portion of the power supply system and the propulsion engine generator powers the distribution bus of the first portion of the power supply system in the event of a malfunction of the first engine-class main power unit. If the power unit is dimensioned so as to power a single portion of the power supply system, the propulsion engine generator powers the portion of the system in which the power unit is defective.

Preferably, the power supply system comprising a first propulsion engine generator and a second propulsion engine generator, the first generator and the second generator respectively power the distribution bus of the first portion and the distribution bus of the second portion of the power supply system during back-up operating mode of the aircraft.

Preferably, the power supply system comprising an emergency back-up power supply system, the management module controls the contactors in such a way as to power the emergency back-up power supply system using an independent emergency power source in the event of a malfunction of the propulsion engine generator during back-up operating mode. Thus, in the event of simultaneous failure of the main power unit and the propulsion engine generator, the vital functions of the aircraft can still be powered.

BRIEF DESCRIPTION OF THE FIGURES

A clear understanding of the invention will be facilitated by the following description, given only by way of example and described with reference to the accompanying drawings, in which:

FIG. 5A is a schematic view of the activation of the engine-class main power units by a single gas generator of the aircraft;

FIG. 5B is a schematic view of the activation of the engine-class main power units by two gas generators of the aircraft;

FIG. 6 is a schematic view of the power supply system with power supplied by a single engine-class main power unit;

FIG. 7 is a schematic view of the power supply system in which the left-hand portion is powered by a single engine-class power unit and the right-hand portion is powered by an engine of the aircraft;

FIG. 8 is a schematic view of the power supply system in which the left-hand portion and the right-hand portion are powered by a single engine-class power unit;

It should be noted that the drawings present the invention in a detailed manner for the implementation of the invention, it of course being possible to use said drawings to better define the invention where necessary.

DESCRIPTION OF ONE OR MORE EMBODIMENTS

Figures 1, 2:
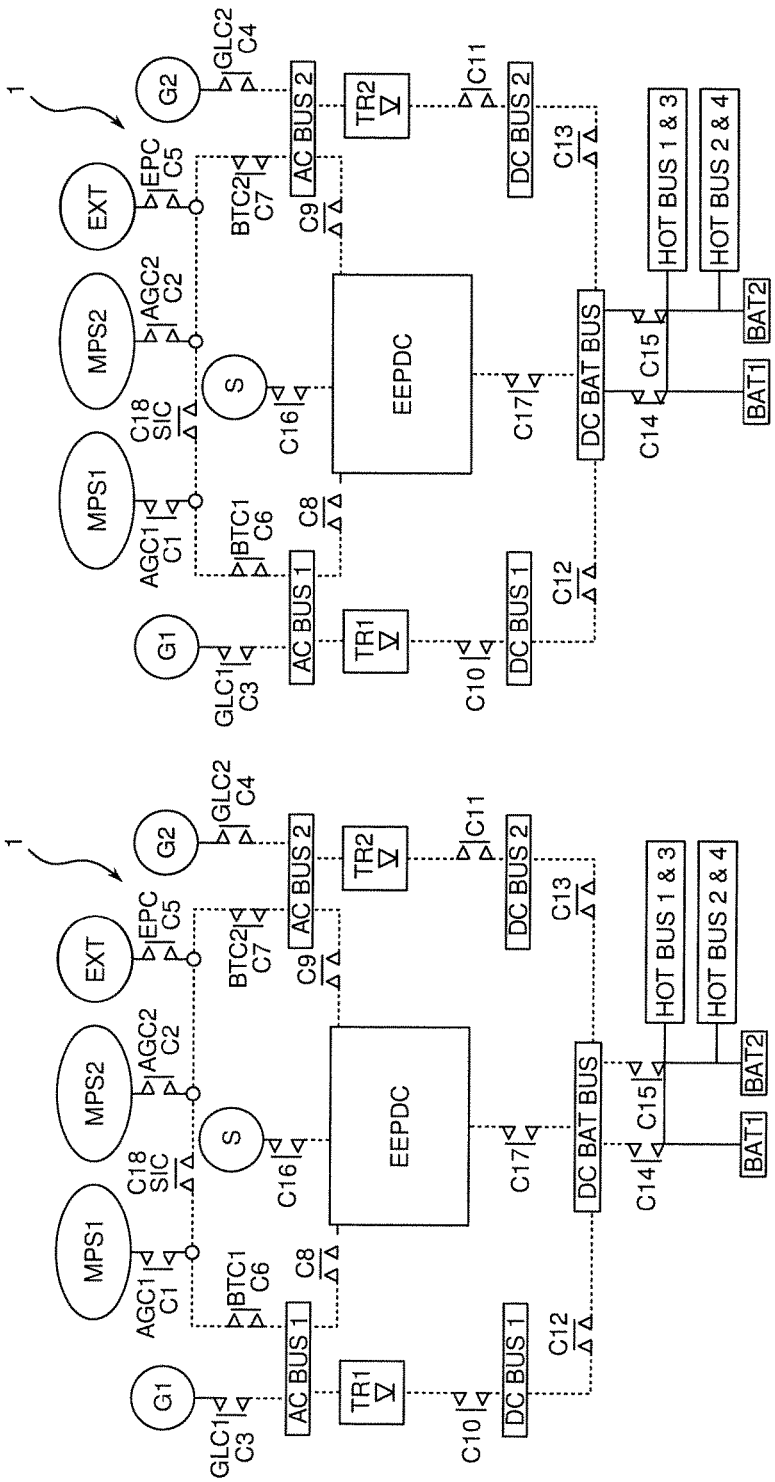
FIG. 1 is a schematic view of the power supply system according to the invention, without a supply of power.
FIG. 2 is a schematic view of the power supply system with power supplied by a battery.

With reference to FIG. 1, an aircraft usually comprises an electrical power supply system 1 in order to power the various pieces of equipment of the aircraft (mechanical actuators, flight controls, in-seat multimedia systems for passengers, cabin ventilation). In electrical terms, a piece of aircraft equipment is considered to be a load which consumes electrical energy and which is powered by an AC or DC power distribution Bus. In this example, the electrical power supply system 1 comprises five distribution Buses, two main alternating current BUSES (ACBUS1, ACBUS2) and three direct current BUSES (DCBUS1, DCBUS2, DCBATBUS) as well as an emergency back-up power supply system EEPDC, also known as an emergency power distribution centre.

In other words, each BUS distributes electrical energy to the loads of the power supply system 1 depending on the needs thereof (direct current or alternating current).

The power supply system is conventionally divided by location into two portions in the aircraft: a portion that is referred to as the "left-hand" portion and a portion that is referred to as the "right-hand" portion. In this example, the left-hand portion comprises two left-hand distribution Buses (ACBUS1, DCBUS1) while the right-hand portion comprises two right-hand distribution Buses (ACBUS1, DCBUS1), the battery bus (DCBATBUS) being common to the right-hand and left-hand portions. Preferably, the power supply system is symmetrical which facilitates its reconfiguration.

Still with reference to FIG. 1, the power supply system 1 also comprises electric batteries BAT1, BAT2 which power the battery bus DCBATBUS. The electric batteries BAT1, BAT2 can also be recharged by the battery bus DCBATBUS when the aircraft is in flight or when the aircraft is on the ground. In FIG. 1, the power supply system 1 can be connected to the external power connections EXT of an airport which allows electrical energy to be supplied to the entire power supply system 1 without using the aircraft's own power sources.

In this example, in a way that is known to a person skilled in the art, the direct current BUSES (DCBUS1 and DCBUS2) are powered either by the battery bus (DCBATBUS) or by the alternating current BUSES (ACBUS1, ACBUS2) via transformers (TR1 and TR2), or by each other.

Still with reference to FIG. 1, the power supply system 1 comprises two generators G1, G2 driven by the main propulsion engines of the aircraft MOT1, MOT2 (not shown) which are capable of providing a supply of electrical energy. The main engines MOT1, MOT2 are conventionally fitted to the aircraft and are capable of supplying the propulsion required for the aircraft to move. The generation of a source of electrical energy by a propulsion engine generator G1, G2 is known to a person skilled in the art and will not be described in more detail. Depending on the type of aircraft and/or the associated power supply system, the number of propulsion engine generators G1, G2 can be greater than two. Furthermore, the number of propulsion engine generators G1, G2 is independent of the number of main engines of the aircraft MOT1, MOT2.

According to the invention, with reference to FIG. 1, the power supply system 1 further comprises two engine-class main power units MPS1, MPS2 which are capable of providing a supply of electrical energy. Said main power units are known from patent application FR 2 964 087 filed by the company TURBOMECA.

Subsequently, a main power unit is designated as the main power unit and referred to by the acronym "MPS" for "Main Power Source". An MPS power unit is based on an auxiliary power unit (known by the acronym "APU") the reliability of which is increased so as to be equivalent to that of a propulsion engine of an aircraft. For this purpose, the MPS power unit is said to be "engine-class". An MPS power unit consists of one or more heat generators driving one or more electric generators. The heat generators can be of the gas turbine or piston engine type, the electric generators can be permanent magnet generators or three-phase generators (a permanent magnet generator or PMG, exciter, alternator) directly coupled to the reactor by means of a power or, optionally, frequency multiplier.

The power supply system 1 further comprises an emergency back-up system EEPDC ("Emergency Electrical Power Distribution Centre") which is capable of powering the most essential loads during large-scale malfunctioning of the power sources of the electrical power supply system 1 (a malfunction of the main power units MPS2, MPS2 and generators G1, G2).

The emergency back-up system EEPDC is connected to an emergency power source S which is, by way of example, in the form of a propeller for generating power known to a person skilled in the art as RAT ("Ram Air Turbine"). Thus, in the same way as a wind turbine, the RAT propeller allows the vital functions of the aircraft to be powered electrically.

Still with reference to FIG. 1, the different BUSES and the different sources of electrical energy are connected via a plurality of contactors C1-C18 which are controlled by a management module (not shown) that is known to a person skilled in the art by the abbreviation PEPDC for "Primary Electrical Power Distribution Centre". A management module of this kind allows the contactors C1-C18 to be controlled in order to connect some power sources to some distribution Buses depending on the desired configuration of the power supply system 1. Advantageously, the management module allows the power sources to be prioritised in order to control the use thereof during normal flight operating conditions, during back-up operating mode or during emergency operating conditions, as will be explained in detail subsequently.

With reference to FIG. 1, the power supply system 1 comprises two contactors C1-C2 which allow the two main power units MPS1, MPS2 to be electrically connected and two contactors C3-C4 to electrically connect the two propulsion engine generators G1, G2, the contactor C3 allowing the external power connections to be electrically connected.

The contactors C6-C7 allow the alternating current BUSES ACBUS1, ACBUS2 to be connected to the main power units MPS1, MPS2, respectively. The contactors C8-C9 allow the alternating current BUSES ACBUS1, ACBUS2 to be connected to the emergency back-up system EEPDC. Similarly, the contactors C10-C11 allow the transformers TR1, TR2 to be connected to the direct current BUSES DCBUS1, DCBUS2 respectively, said direct current BUSES being connected to the battery bus DCBATBUS by the contactors C12-C13, respectively. The batteries BAT1, BAT2 are connected to the battery bus DCBATBUS by the contactors C14-C15, respectively.

For its part, the contactor C16 connects the emergency back-up system EEPDC to the emergency power source S, the contactor C17 connecting the emergency back-up system EEPDC to the battery bus DCBATBUS. As shown in FIG. 1, the contactor C18 connects the left-hand portion of the power supply system to the right-hand portion thereof.

The management module controls the contactors C1-C18 in order to reconfigure the power supply system and connect some power sources to some distribution buses. In the example shown in FIG. 1, the contactors C1-C18 are all open.

According to the invention, during normal operating conditions of the aircraft, the distribution Buses are powered by the engine-class main power units MPS1, MPS2 whereas during back-up operating mode of the aircraft the distribution Buses are powered by the propulsion engine generators G1, G2. "Back-up operating mode" means that at least one of the main power units MPS1, MPS2 is defective. The management module controls the contactors C1-C18 so that the main power units MPS1, MPS2 supply, by default, electrical energy to the distribution Buses so as to not load the main engines of the aircraft MOT1, MOT2, which limits the fuel consumption of said engines MOT1, MOT2.

As shown in FIG. 1, the distribution Buses of the "left-hand" portion of the power supply system 1 are capable of being powered, during normal operating conditions, by the first power unit MPS1 and, during back-up operating mode, by the first propulsion engine generator G1. Similarly, the distribution Buses of the "right-hand" portion of the power supply system 1 are capable of being powered, during normal operating conditions, by the second power unit MPS2 and, in back-up operating mode, by the second propulsion engine generator G2.

Several embodiments of the method for managing the electrical power supply system of FIG. 1 will be described with reference to FIGS. 2 to 10 in which the solid lines correspond to the supply of electrical power and the dashed lines correspond to the absence of a supply of electrical power. In these different embodiments, the management module controls the contactors C1-C18 depending on the availability of the different power sources.

Supply of Power by Batteries

With reference to FIG. 2, when the aircraft is on the ground, the aircraft batteries BAT1, BAT2 are activated due to the connection of the contactors C14-C5 in such a way as to power the distribution bus DCBATBUS. A supply of power of this type by means of batteries is similar to the prior art.

Supply of Power by Electrical Power Connections

Figures 3, 4:
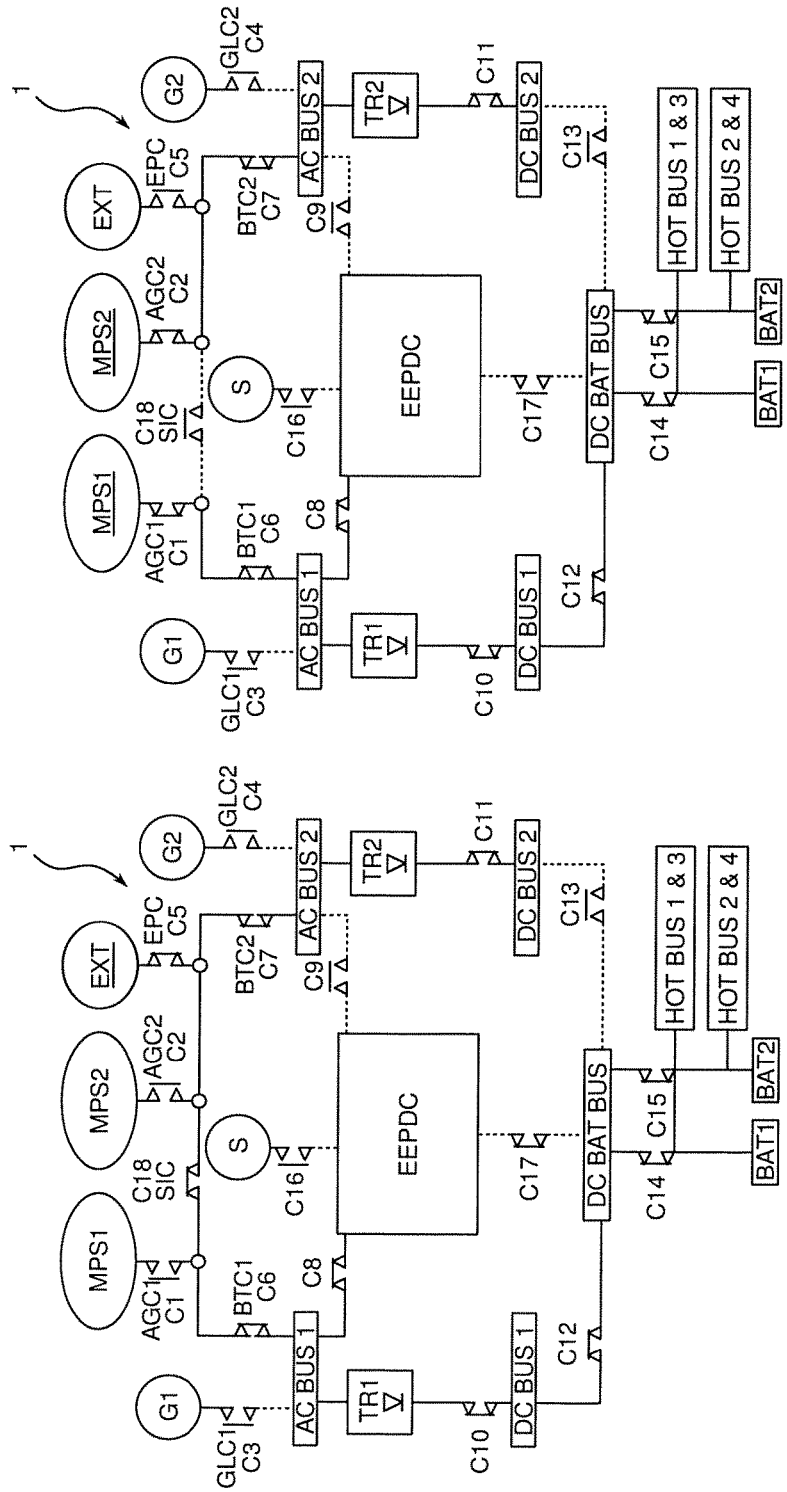
FIG. 3 is a schematic view of the power supply system with power supplied by an external power connection.
FIG. 4 is a schematic view of the power supply system with power supplied by the engine-class main power units during normal operating conditions.

With reference to FIG. 3, when the aircraft is on the ground, the electrical power supply system 1 is powered by the electrical power connections EXT of the airport, which power the distribution buses of the left-hand portion and the right-hand portion of the electrical power supply system 1 due to the connections of the contactors C5, C6, C7, C8, C10, C11 and C12. In particular, the power connections allow the AC BUSES (ACBUS1, ACBUS2), DC BUSES (DCBATBUS, DCBUS1 and DCBUS2) and the transformers (TR1 and TR2) to be powered.

Advantageously, as shown in FIG. 3, the electrical power connections EXT allow the batteries BAT1, BAT2 of the aircraft to be recharged due to the connection of the contactors C14-C15. A supply of power of this type by means of electrical power connections is similar to the prior art.

Stand-alone Power Supply During Normal Operating Conditions

With reference to FIG. 4, in the case of a stand-alone aircraft, for example during flight or on the ground (taxiing), the electrical power supply system 1 is powered by the main power units MPS1, MPS2 which power the distribution buses of the left-hand portion and the right-hand portion respectively of the electrical power supply system 1, due to the connections of the contactors C1, C2, C6, C7, C8, C10, C11 and C12. Advantageously, the power units MPS1, MPS2 allow the AC BUSES (ACBUS1, ACBUS2), DC BUSES (DCBATBUS, DCBUS1 and DCBUS2) and transformers (TR1 and TR2) to be powered and the batteries BAT1, BAT2 of the aircraft to be recharged, as shown in FIG. 4.

During normal operating conditions, the propulsion engine generators G1, G2 are not involved in the generation of electricity by the electrical power supply system. This type of management of the electrical power supply system 1 is contrary to the prejudices of the prior art which required propulsion engine generators G1, G2 to power the distribution buses. Thanks to the invention, it is no longer necessary to adapt the speed of the propulsion engines of the aircraft to meet the electrical needs of the aircraft. In other words, the engines of the aircraft only supply propulsive energy during normal operating conditions, which limits their fuel consumption. Advantageously, the electrical needs are no longer correlated to the propulsive needs.

Supply of Power During Back-up Flight Operating Mode: Failure of an MPS Power Unit According to a first aspect, with reference to FIG. 5A, the two main power units MPS1, MPS2 comprise a single gas generator GG to power the entire system 1. As previously indicated, given that the main power units MPS1, MPS2 are engine-class, the gas generator GG has a high degree of reliability, equivalent to that of the propulsion engines of the aircraft. In other words, each main power unit MPS1, MPS2 is dimensioned so as to provide for all of the power supply system 1.

According to this hypothesis, with reference to FIG. 6, if the second main power unit MPS2 has a defect and if the gas generator GG thereof is not defective, under the control of the management module the first power unit MPS1 can take over and, alone, power the distribution buses of the right-hand portion and the left-hand portion of the electrical power supply system 1 as shown in FIG. 6. For this purpose, the contactor C2 is open to disconnect the second main power unit MPS2. The contactor C18 is closed to allow both portions of the power supply system 1 to be powered.

According to a second aspect, with reference to FIG. 5B, the two main power units MPS1, MPS2 each comprise a gas generator GG1, GG2. As previously indicated, given that the main power units MPS1, MPS1 are engine-class, each gas generator GG1, GG2 has a high degree of reliability. Each power unit MPS1, MPS2 is dimensioned so as to provide for only one portion of the power supply system 1. In this example, as previously indicated, the power units MPS1, MPS2 power the distribution buses of the left-hand portion and of the right-hand portion respectively of the power supply system 1.

According to this hypothesis, with reference to FIG. 7, if the second main power unit MPS2 has a defect, the right-hand portion of the system 1 is no longer directly powered. Given that the first main power unit MPS1 cannot provide for the distribution buses of the right-hand portion (ACBUS2, DCBUS2) in addition to those of the left-hand portion of the power supply system 1, the second propulsion engine generator G2 is activated to substitute the second main power unit MPS2 as shown in FIG. 7. For this purpose, the management module commands the contactor C4 to close whereas the contactor C7 remains open.

In this example, the second generator G2 electrically powers the distribution bus ACBUS2, the transformer TR2, and the distribution bus DCBUS2. The batteries BAT1, BAT2 are, for their part, recharged by the first power unit MPS1 as shown in FIG. 7.

It goes without saying that the invention is similarly applicable in the event of a malfunction of the first main power unit MPS1, the first generator G1 then taking over.

With reference to FIG. 8, in the event of the second power unit MPS2 and the distribution bus ACBUS2 having a defect, the second propulsion engine generator G2 cannot power the distribution bus DCBUS2.

In addition, the management module controls the contactor C13 so as to connect the distribution bus DCBUS2 to the battery bus DCBATBUS.

In other words, the management module allows the right-hand portion of the system 1 to be powered within the limits of the capacity for power supply of the first main power unit MPS1. In this example, with reference to FIG. 8, the first power unit MPS1 powers all of the left-hand portion of the system 1 but also the bus DCBUS2 via the bus DCBATBUS.

It goes without saying that the invention is similarly applicable in the event of a malfunction of the first main power unit MPS1 and the bus ACBUS1, the management of the power supply system advantageously being symmetrical.

It goes without saying that a propulsion engine generator G1, G2 could also be used to provide additional power whereas the main power unit is dimensioned so as to power all of the power supply system 1. Managing the electrical energy in such a way allows some energy to be kept in reserve if required.

Figures 9, 10:
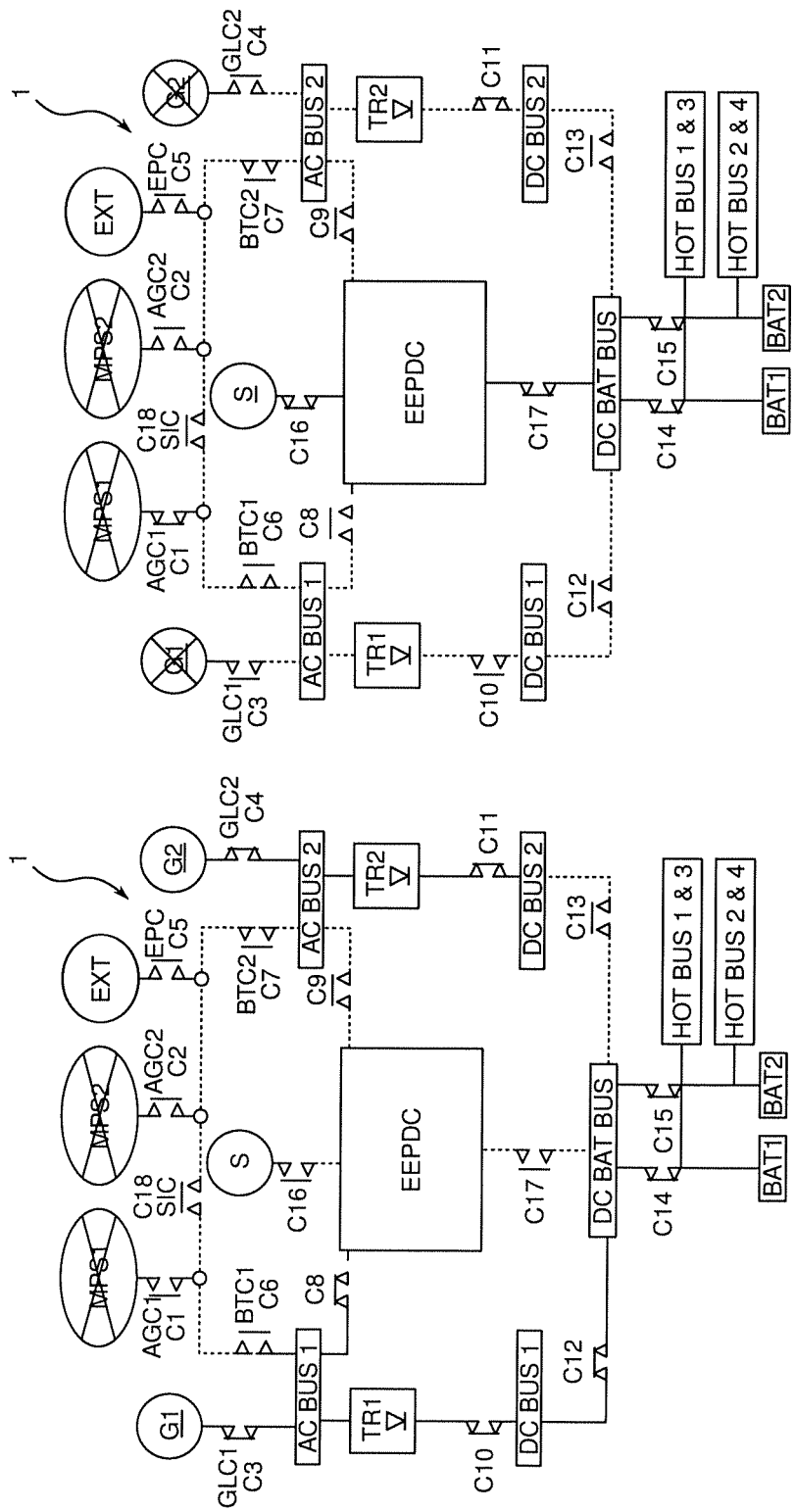
FIG. 9 is a schematic view of the power supply system in which the left-hand portion and the right-hand portion are powered by the aircraft engines.
FIG. 10 is a schematic view of the power supply system with an emergency power source.

Supply of Power During Back-up Flight Operating Mode: Failure of Two MPS Power Units According to the invention, in the event of a malfunction of the main power units MPS1, MPS2, the management module commands the propulsion engine generators G1, G2 to power the distribution buses, as shown in FIG. 9. For this purpose, the contactors C3 and C4 are closed by the management module whereas the contactors C1, C2 remain open.

With reference to FIG. 9, when the aircraft is in flight, the electrical power supply system 1 is powered by the propulsion engine generators G1, G2 which power the left-hand portion and the right-hand portion respectively of the electrical power supply system 1. Advantageously, the generator G1 allows the batteries BAT1, BAT2 of the aircraft to be recharged as shown in FIG. 9.

Unlike the prior art in which the generators G1, G2 were used during stand-alone operation (flight or taxiing) during normal operating conditions, said generators are only used during back-up operating mode of the aircraft.

Power Supply During Emergency Flight Operating Conditions

According to the invention, in the event of a malfunction of, on the one hand, the power units MPS1, MPS2 and, on the other hand, the generators G1, G2, the emergency back-up system EEPDC is powered by an emergency power source S which, here, takes the form of a RAT propeller for generating power, the contactor C16 then being closed. The batteries BAT1, BAT2 are also involved in supplying power, the contactor C17 also being closed. An emergency power supply of this kind is similar to the prior art.

The invention claimed is:
1. Method for managing an electrical power supply system of an aircraft, the power supply system comprising:
 at least two distribution buses arranged so as to power electrical loads, the distribution buses belonging respectively to a right-hand portion and a left-hand portion of the power supply system;
 at least one generator of a propulsion engine of the aircraft which is capable of providing a supply of electrical energy;
 a first engine-class main power unit and a second engine-class main power unit, which are capable of providing a supply of electrical energy, the first engine-class main power unit and the second engine-class main power unit respectively supply the distribution bus of the first portion and the distribution bus of the second portion of the power supply system during normal operating conditions of the aircraft;

a plurality of contactors which are capable of electrically connecting the distribution buses to the propulsion engine generator and/or the main power units; and a management module which is capable of controlling the contactors; method wherein:

during normal operating conditions of the aircraft, the management module controls the contactors so as to power the distribution buses using the engine-class main power units and during back-up operating conditions of the aircraft, the management module controls the contactors so as to power the distribution buses using the propulsion engine generator.

2. Method according to claim 1, wherein, during normal operating conditions of the aircraft, the distribution bus is powered exclusively by the engine-class main power unit.

3. Method according to claim 1, wherein the second engine-class main power unit alone powers the distribution buses of the first portion and the second portion of the power supply system in the event of a malfunction of the first engine-class main power unit.

4. Method according to claim 1, wherein the second engine-class main power unit powers the distribution bus of the second portion of the power supply system and the propulsion engine generator powers the distribution bus of the first portion of the power supply system in the event of a malfunction of the first engine-class main power unit.

5. Method according to claim 1, wherein, the power supply system comprising a first propulsion engine generator and a second propulsion engine generator, the first generator and the second generator respectively power the distribution bus of the first portion and the distribution bus of the second portion of the power supply system during back-up operating mode of the aircraft.

6. Method according to claims 1, wherein, the power supply system comprising an emergency back-up power supply system, the management module controls the contactors in such a way as to power the emergency back-up power supply system using an independent emergency power source in the event of a malfunction of the propulsion engine generator during back-up operating mode.

* * * * *